United States Patent Office 3,103,507
Patented Sept. 10, 1963

3,103,507
SUGAR ESTERS AND PROCESS OF PREPARING THE SAME
Kurt Knoevenagel, Kleinkarlbach, Grunstadt, Germany, assignor to C. F. Spiess & Sohn Chemische Fabrik, Kleinkarlbach, uber Grunstadt, Germany
No Drawing. Filed Feb. 23, 1960, Ser. No. 10,018
Claims priority, application Germany Feb. 26, 1959
12 Claims. (Cl. 260—234)

The present invention relates to new chemical compounds and a process of preparing the same. More specifically the present invention is directed to esters derived from mono- or disaccharoses and inorganic acids or acids of phosphorus or acids of sulfur and to a process of preparing these new compounds.

The new esters of monosaccharoses have the general formula:

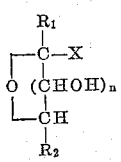

in which $R_1$ and $R_2$ are the same or different and represent H and/or —$CH_2OH$ and/or —CHOH—$CH_2OH$ and X represents an acid radical of an inorganic acid or an acid radical of an acid of phosphorus or an acid radical of an acid of sulfur and $n$ is 2 or 3.

The new sugar esters of the present invention are formed from aldoses or ketoses by transesterification of the free semi-acetal hydroxy group or, respectively, of the free semi-ketal hydroxy group of the aldoses or ketoses with an ester of an acid mentioned herein. Especially the semi-acetal or semi-ketal hydroxy groups of the cyclic forms of the aldoses or ketoses may be brought to reaction with an ester of an inorganic acid or with an ester of an acid of phosphorus or with an ester of an acid of sulfur under the conditions of a transesterification in which case an ester of the aldose or ketose is obtained.

The reaction runs according to the following general equation:

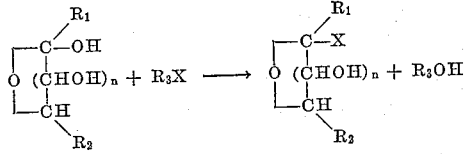

in which $R_3$ represents a simple organic, aliphatic or mixed aliphatic aromatic group and $R_1$, $R_2$, X and $n$ have the same meaning as above.

Certain disaccharoses which still contain a free semi-acetal hydroxy group or, respectively, a free semi-ketal hydroxy group can react in the same way. The thus obtained esters of disaccharoses are also new and shall be included in this invention.

The reaction can be carried out with any compound containing a semi-acetal or semi-ketal hydroxy group and especially with the aldoses and ketoses of the mono- and disaccharoses, provided with these compounds still contain a free semi-acetal hydroxy group or, respectively, a free semi-ketal hydroxy group. Also, lower carbohydrates such as pentoses or tetroses may be used. Under the conditions of the reaction of the present invention only the hydroxy groups of the semi-acetal or, respectively, of the semi-ketal compound are esterified, while the other free alcoholic hydroxy groups still present in the molecule remain unchanged.

The invention may be explained by describing for instance the reaction of glucose with dimethylsulfate. While β-methyl glucoside or tetramethyl β-methyl glucoside are formed from glucose by reacting with dimethylsulfate, in the previously known manner, a glucosyl methylsulfate is obtained under the conditions of the reaction of this invention. Thus no methylation takes place by the reaction of the mono- or disaccharoses with an ester of the sulfuric acid, as for example with dimethylsulfate, but a compound is obtained with the methylsulfate (mesyl) group in the place of the semi-acetal hydroxy group, while the other free alcoholic hydroxy groups remain unchanged. All the compounds with a semi-acetal or, respectively, semi-ketal group react with esters of acids of phosphorus or with esters of acids of sulfur or with inorganic esters under the conditions of this invention in the same way.

The esters of the acids of sulfur, such as the esters of the sulfuric acid and the esters of the sulfonic acids, for example, the p-toluenesulfonic acid, generally react in the same way. Also, the esters of other inorganic acids, for example, the esters of the acids of phosphorus, the esters of boric acid and others, are also suitable for the reaction.

Esters of polybasic acids may enter into reaction either once or twice or several times with one or two or, respectively, more moles of the semi-acetal or, respectively, the semi-ketal compounds. In these cases sugar esters are obtained in which one or two hydroxy groups of the acyl group are still esterified by the original alcohol.

The reaction is carried out under the conditions normally used for transesterification reactions thus it is preferable to operate in an inert solvent and at an elevated temperature and under a reduced pressure.

As known methylation takes place in a watery solution which contains a stoichiometric amount of alkali. Thus, to avoid methylation no water should be contained in the reaction mixture when an alkaline catalyst is used. Small amounts of water in the beginning of the reaction may be removed by working under a reduced pressure during the reaction.

Basic catalysts as well as acid catalysts normally used for transesterification reactions, such as, for example, potassium carbonate, sodium carbonate, calcium oxide, calcium hydride, alkali metal alcoholates, zinc chloride and mercury chloride in amounts of 1 to 100 mole percent, are employed. In some cases, however, the reaction may be carried out without any catalyst at all. Among others, such as, for instance, morpholine or dimethyl sulfoxide or pyridine, dimethylformamide seems to be especially suitable as the inert solvent. Good yields are generally obtained by heating the reactants in an inert solvent at a temperature from 20° C. to 90° C. for from 30 to 2 hours. However, as the individual compounds produced possess different sensitivity, it is important to ascertain the most suitable temperature and reaction time for each compound. Preferably, the temperatures should not be too high.

In order to facilitate the removal of a volatile alcohol $R_3OH$ formed by the reaction, it is advisable to operate under a reduced pressure and to pass a slow stream of inert gas through the reaction mixture.

After heating the catalyst is filter off and the solvent distilled off under a reduced pressure. The residue is purified by recrystallization from a suitable solvent and/or by precipitation or chromatographically.

The following examples illustrate the invention:

*Example 1*

18 g. of glucose (0.1 mole) were warmed and dissolved in 150 cc. of dimethylformamide. Then 18.6 g. of methyl p-toluenesulfonate (0.1 mole) and 0.2 g. of dried potassium carbonate were added. The mixture was heated to 70° C. for 12 hours and kept under a reduced pressure of 80 mm. Hg. After heating the catalyst was filtered off and the dimethylformamide was distilled off under a reduced pressure. The remaining colourless or slightly yellow coloured residue was dissolved by shaking in 50 cc. of absolute alcohol and reprecipitated by adding isopropyl alcohol. After standing for a longer period in an ice box the precipitate was filtered off and washed thoroughly with isopropyl alcohol, and dried. 25.2 g. of glucosyl-p-toluenesulfonate were obtained in the form of a colourless hydroscopic solid with a melting point of 132° C., which was soluble in cold water but less soluble in alcohol. The glucosyl-p-toluenesulfonate gives no reaction with phenylhydrazine upon standing in a solution mixture of alcohol, water and acetic acid for a longer period. On analysis 9.44% sulfur were found (calculated=9.57%).

*Example 2*

18 g. of glucose (0.1 mole) were warmed and dissolved in 150 cc. of dimethylformamide. Then 18.6 g. of methyl p-toluenesulfonate were added. The mixture was heated to 75° C. for 12 hours and kept under a reduced pressure of 80 mm. Hg. The slightly yellow syrup obtained by distilling off the dimethylformamide was dissolved in 20 cc. of absolute ethanol and reprecipitated by adding of 120 cc. of isopropyl alcohol. The reprecipitation was repeated. The precipitate was filtered off, washed with isopropyl alcohol and dried. 10.2 g. of glucosyl p-toluenesulfonate were obtained in the form of a colourless solid powdery substance. The melting point and the properties were substantially the same as those of the product of Example 1.

*Example 3*

Example 2 was repeated, except that, instead of using dimethylformamide as the solvent, 150 cc. of morpholine were used. 15.2 g. of glucosyl-p-toluenesulfonate were obtained. The melting point and the properties were substantially the same as those of the product of Example 1.

*Example 4*

18 g. of glucose (0.1 mole) were warmed and dissolved in 150 cc. of dimethylformamide. Then 18.6 g. of methyl p-toluenesulfonate and 0.2 g. of dried and well ground zinc chloride were added. The mixture was heated to 75° C. for 12 hours and kept under a reduced pressure of 80 mm. Hg. After treating the residue in the same way as in Example 2, 17.7 g. of glucosyl p-toluenesulfonate were obtained. The melting point and the properties were substantially the same as those of the product of Example 1.

*Example 5*

Example 4 was repeated, except that, instead of using zinc chloride, 0.2 g. of mercury chloride were used. 12.4 g. of glucosyl p-toluenesulfonate were obtained. The melting point and the properties were substantially the same as those of the product of Example 1.

*Example 6*

18 g. of glucose (0.1 mole) were warmed and dissolved in 150 cc. of dimethylformamide. Then 26.2 g. of benzyl p-toluenesulfonate and 0.05 g. potassium carbonate were added. The mixture was heated to 75° C. for 12 hours and kept under a reduced pressure of 80 mm. Hg. After heating the catalyst was filtered off and the dimethylformamide as well as the benzyl alcohol, formed by the reaction, were distilled off under a reduced pressure. After treating the residue in the same way as in Example 2, 7.95 g. of glucosyl p-toluenesulfonate were obtained. The melting point and the properties were substantially the same as those of the product of Example 1.

*Example 7*

18 g. of glucose (0.1 mole) were warmed and dissolved in 150 cc. of dimethylformamide. Then 19 g. of dimethylsulfate (0.15 mole) and 0.2 g. of dried potassium carbonate were added. The mixture was heated to 70° C. for 10 hours and kept under a reduced pressure of 80 mm. Hg. After heating the catalyst was filtered off and the dimethylformamide was distilled off under a reduced pressure. The remaining slightly yellow coloured residue was dissolved in 25 cc. of dimethylformamide and reprecipitated by adding 150 cc. of isopropyl alcohol. The precipitate as filtered off, washed with isopropyl alcohol and dried in a desiccator under reduced pressure. 16.2 g. of glucosyl methylsulfate were obtained in the form of a light yellow amorphous, hygroscopic mass. The substance was soluble in cold water, but less soluble in alcohol. The glucosyl methylsulfate gives no reaction with phenylhydrazine upon standing in a solution mixture of alcohol, water and acetic acid for a longer period. On analysis 11.57% of sulfur was found (calculated =11.68%).

*Example 8*

18 g. of glucose (0.1 mole) were warmed and dissolved in 150 cc. of dimethylformamide. Then 28 g. of trimethylphosphate (0.2 mole) and 0.7 g. of dried potassium carbonate were added. The mixture was heated to 90° C. for 12 hours and kept under a reduced pressure of 80 mm. Hg. After heating the catalyst was filtered off and the dimethylformamide was distilled off under reduced pressure. The remaining syrup was warmed and dissolved in 50 cc. of absolute ethanol and reprecipitated by cooling. The precipitate was filtered off, washed with ether and dried. 15.2 g. of glucosyl dimethyl phosphate were obtained in the form of a slightly yellow syrup. It was soluble in cold water, but less soluble in alcohol. The glucosyl dimethylphosphate was easily split up by hydrolysis on standing for a short time in a watery acid or alkaline solution. Glucose was obtained by this hydrolysis. On analysis of the glycosyl dimethylphosphate 10.71% of phosphorus was found (calculated=10.8%).

*Example 9*

18 g. of glucose (0.1 mole) were warmed and dissolved in 150 cc. of dimethylformamide. Then 18.6 g. of trimethyl phosphite (0.15 mole) and 0.5 g. of dried potassium carbonate were added. The mixture was heated to 50° C. for 22 hours and kept under a reduced pressure of 100 mm. Hg. After heating the catalyst was filtered off and the dimethylformamide was distilled off under reduced pressure. The remaining amber coloured tough residue was dissolved in 20 cc. of absolute methyl alcohol and reprecipitated by adding ether. The precipitate was filtered off, washed with ether and dried in a desiccator under reduced pressure. 19.7 g. of glucosyl dimethyl phosphite were obtained in the form of a slightly yellow hygroscopic syrup. This syrup still contained a small quantity of glucose and could be purified by chromatography.

*Example 10*

3.6 g. of glucose (0.02 mole) were warmed and dissolved in 50 cc. of dimethylformamide. Then 5.4 g. of tetramethyl pyrophosphate and 0.1 g. of dried potassium carbonate were added. The mixture was heated to 65° C. for 12 hours and kept under a reduced pressure of 80 mm. Hg. After heating the catalyst was filtered off and the dimethylformamide was distilled off under a reduced pressure. The remaining light brown syrup was dissolved in 6 cc. of methyl alcohol and reprecipitated by adding 30 cc. of isopropyl alcohol. The precipitate was filtered off, washed with isopropyl alcohol and dried in a desiccator under a reduced pressure. 5.8 g. of a tough light brown mass were obtained which was a mixture of the different glucosyl methyl pyrophosphates. On analysis 6.8% of phosphorus were found (calculated=7.52%).

The substance still contained a small quantity of glucose from which it could be separated chromatographically. This substance could be split up by hydrolysis.

*Example 11*

18 g. of glucose (0.1 mole) were warmed and dissolved in 150 cc. of dimethylformamide. Then 10.8 g. of cyclic tetraethyl tetraphosphate (0.025 mole) and 0.1 g. of dried potassium carbonate were added. The mixture was heated to 75° C. for 12 hours and kept under a reduced pressure of 80 mm. Hg. After heating the catalyst was filtered off and the dimethylformamide was distilled off under reduced pressure. The remaining syrup was dissolved in 20 cc. of ethanol and reprecipitated by adding 120 cc. of dried ether. The precipitate was separated and dried under a reduced pressure—yield, 12 g. The substance still contained a small quantity of glucose from which it could be separated chromatographically. It is believed that the substance obtained is the triglucosylethyltetraphosphate. On analysis 14.75% of phosphorus were found (calculated for triglucosyl ethyl tetraphosphate=15.05%). Different glucosyl phosphoric acids could be obtained when the substance was hydrolysed carefully with water.

*Example 12*

18 g. of glucose (0.1 mole) were warmed and dissolved in 150 cc. of dimethylformamide. Then 22.2 g. of tri-n-butyl borate (0.1 mole) and 0.2 g. of dried potassium carbonate were added. The mixture was heated to 75° C. for 12 hours and kept under a reduced pressure of 80 mm. Hg. After heating the catalyst was filtered off and the dimethylformamide was distilled off under reduced pressure. The remaining syrup was dissolved in 20 cc. of absolute ethanol and reprecipitated by adding 350 cc. of anhydrous ether. After standing for a short time the precipitate was filtered off and dried. 18.4 g. of glucosyl di-n-butyl borate were obtained in the form of a colourless hygroscopic solid with a melting point of about 90° C. By treating the water the glucosyl di-n-butyl borate was split up by hydrolysis in the same way as other alkyl esters of boric acid. Therefore it was necessary to avoid any traces of water during the process of preparation.

*Example 13*

18 g. of galactose (0.1 mole) were warmed and dissolved in 150 cc. of dimethylformamide. Then 18.6 g. of methyl p-toluenesulfonate (0.1 mole) and 0.2 g. of dried potassium carbonate were added. The mixture was heated to 70° C. for 12 hours and kept under a reduced pressure of 80 mm. Hg. After heating the catalyst was filtered off and the dimethylformamide was distilled off under reduced pressure. The remaining residue was dissolved in 70 cc. of absolute ethanol and precipitated by adding about 140 cc. of anhydrous ether. After standing for a short time at a temperature of 0° C., the precipitate was filtered off, washed with ether and dried under a reduced pressure. 22 g. of galactosyl p-toluenesulfonate were obtained in the form of a colourless solid mass, which deliquesced under moist conditions. The substance was soluble in cold water. The galactosyl p-toluenesulfonate gave no reaction with phenylhydrazine upon standing in a solution mixture of alcohol, water and acetic acid for a longer period. On analysis 9.49% of sulfur were found (calculated=9.58%).

*Example 14*

15 g. of xylose (0.1 mole) were warmed and dissolved in 150 cc. of dimethylformamide by warming. Then 18.6 g. of methyl p-toluenesulfonate (0.1 mole) were added. The mixture was heated to 55° C. for 12 hours and kept under a reduced pressure of 80 mm. Hg. After heating the dimethylformamide was distilled off under a reduced pressure. The remaining, almost colourless syrup was dissolved in 15 cc. of anhydrous ether and reprecipitated by adding 120 cc. of isopropyl alcohol. The precipitate was filtered off and dried after washing with isopropyl alcohol. 14.5 g. of xylosyl p-toluenesulfonate were obtained in the form of a colourless solid substance which melted at about 75–79° C. with foaming. The xylosyl p-toluenesulfonate gave no reaction with phenylhydrazine on standing in a solution mixture of alcohol, water and acetic acid for a longer period. The substance was soluble in cold water but less soluble in alcohol and had no hygroscopic properties. On analysis 10.42% of sulfur were found (calculated=10.52%).

*Example 15*

10 g. of xylose (0.066 mole) were warmed and dissolved in 70 cc. of dimethylformamide by warming. Then 8.4 g. of dimethylsulfate (0.066 mole) and 0.1 g. of dried potassium carbonate were added. The mixture was heated to 75° C. for 12 hours and kept under a reduced pressure of 80 mm. Hg. After heating the catalyst was filtered off and the dimethylformamide was distilled off under a reduced pressure. The remaining residue was dissolved in 50 cc. of absolute ethanol and reprecipitated by adding 150 cc. of isopropyl alcohol. After standing for a short time the substance was filtered off, washed with isopropyl alcohol and dried in a desiccator under a reduced pressure. 11.5 g. of xylosyl methylsulfate were obtained in the form of an amorphous hygroscopic mass. On analysis 10.39% of sulfur were found (calculated=13.1%).

The substance still contained a small quantity of unchanged xylose which could be removed chromatographically.

*Example 16*

5 g. of arabinose (0.033 mole) and 6.2 g. of methyl p-toluenesulfonate (0.033 mole) were warmed and dissolved in 50 cc. of dimethylformamide. The mixture was heated to 55° C. for 12 hours and kept under a reduced pressure of 80 mm. Hg. After heating the dimethylformamide was distilled off under a reduced pressure. The remaining slightly yellow coloured syrup was dissolved in 50 cc. of absolute ethanol and reprecipitated by adding 70 cc. of isopropyl alcohol. After standing for a short time the flocky precipitate was filtered off, washed with isopropyl alcohol and dried in a desiccator under a reduced pressure. 6.2 g. of arabinosyl p-toluenesulfonate were obtained in the form of a slightly yellow coloured syrup which deliquesces immediately on standing under moist conditions.

*Example 17*

34.2 g. of lactose (0.1 mole) were warmed and dissolved in 200 cc. of dimethylformamide. Then 18.6 g. of methyl p-toluenesulfonate (0.1 mole) and 0.2 g. of dried potassium carbonate were added. The mixture was heated to 75° C. for 12 hours and kept under a reduced pressure of 80 mm. Hg. After heating, the catalyst was filtered off and the dimethylformamide was distilled off under reduced pressure. The remaining amber coloured syrup was dissolved in 35 cc. of absolute methyl alcohol and reprecipitated by adding 250 cc. of isopropyl alcohol. The precipitate was filtered off, washed with isopropyl alcohol and dried at a temperature of 70° C. under a reduced pressure. 40.2 g. of lactosyl p-toluenesulfonate were obtained in the form of an amorphous, slightly yellow coloured mass which exhibited highly hygroscopic properties. The substance gave no reaction with phenylhydrazine on standing in a solution mixture of alcohol, water and acetic acid for a longer period.

*Example 18*

18 g. of fructose (0.1 mole) and 19 g. of methyl p-toluenesulfonate (about 0.1 mole) were warmed and dissolved in 150 cc. of dimethylformamide. The mixture was heated to 55° C. for 12 hours and kept under a reduced pressure of 80 mm. Hg. After heating the dimethylformamide was distilled off under a reduced pressure. The remaining syrup was dissolved in 30 cc. of acetone and reprecipitated by adding 100 cc. of anhydrous ether. The precipitate was filtered off and dried. 28.1 g. of fructosyl p-toluenesulfonate were obtained in the form of an almost colourless syrupy mass.

*Example 19*

18 g. of fructose (0.1 mole) were warmed and dissolved in 150 cc. of dimethylformamide. Then 21 g. of trimethylphosphate and 0.2 g. of dried potassium carbonate were added. The mixture was heated to 60° C. for 12 hours and kept under a reduced pressure of 80 mm. Hg. After heating the catalyst was distilled off under reduced pressure. The remaining syrup was dissolved in 15 cc. of absolute ethanol and reprecipitated by adding 120 cc. of isopropyl alcohol. The precipitate was filtered off, washed with isopropyl alcohol and dried in a desiccator under a reduced pressure. 6.1 g. of fructosyl-2-dimethylphosphate were obtained in the form of a light syrup. On analysis 10.38% of phosphorus were found (calculated=10.73%).

*Example 20*

18 g. of glucose (0.1 mole) were warmed and dissolved in 150 cc. of dimethylformamide. Then 20 g. of triethylphosphite and 0.2 g. of dried potassium carbonate were added. The mixture was heated to 70° C. for 16 hours and kept under a reduced pressure of 80 mm. Hg. During this time a slight stream of an inert gas, such as nitrogen, was bubbled through the reaction mixture. After heating the catalyst was filtered off and the dimethylformamide as well as the excess of the triethylphosphite were distilled off under a reduced pressure. A colourless crystalline substance was precipitated by adding isopropyl alcohol to the residue. The substance was filtered off, washed with isopropyl alcohol and dried. 6.8 g. of glucosyl diethyl phosphite were obtained in the form of a colourless crystalline substance which melted at 89–91° C. under foaming. It was soluble in cold water but less soluble in isopropyl alcohol. On analysis 9.22% of phosphorus were found (calculated=10.33%).

The substance still contained a small quantity of glucose.

The sugar esters obtained according to the invention are novel and have not been previously described. The compounds individually possess very different properties depending on the components from which they are formed. Thus the p-toluenesulfonates, for example, are rather stable, while the phosphates, for example, obtained from trialkylphosphates are especially sensitive to hydrolysis. The borates are extremely sensitive to hydrolysis.

The thus obtained esters of the mono- and disaccharides may be reacted further by any reaction known from the chemistry of the saccharides and therefore they may be used as intermediate products. Only a few examples of the many different possibilities of reaction are given hereafter:

The remaining free alcoholic hydroxy groups may be further converted in the known ways. They can, for example, be esterified and/or etherified. They can be oxidized. Generally they can be brought to reaction or converted by any reaction known in sugar chemistry.

The sugar esters may be split up by hydrolysis. In this case the semi-acetal group or, respectively, the semi-ketal group is reformed. But it is also possible to split them up by hydrogenation.

The new sugar esters, such as, for example, the p-toluenesulfonates, can be reacted with organic bases such as amines, pyridine, dipyridyl, quinoline, acridine, purine, pyrimidine and other organic bases as well as with the substituted compounds of these bases forming the respective ammonium salts. For instance hydroxy compounds or carboxyamide compounds of these amines such as hydroxy pyridine or nicotinamide may be used. Thus it is possible to obtain an aldosylpyridiniumacylate compound starting from an aldose over the sugar ester obtainable therefrom by an immediately following reaction with, for example, nicotinamide.

The acyl group of the ammonium salt may be replaced by other acyl groups with the aid of ion exchangers. The compound may furthermore be hydrogenated directly to the corresponding dihydro or respectively deoxy forms known of certain coenzymes. It is an advantage of this process that the free alcoholic hydroxy groups of the aldoses need not be protected specially and therefore need not be reformed later on by a complicated process. Thus it is possible to obtain aldosyl ammonium salts of esters of aldoses directly and by a shorter way, which is of interest whenever the aldoses are sensitive to acids or alkalies. The advantage of the new way becomes evident by comparing the several intermediate steps of the two ways of making dihydronicotinamide of D-glucose as to be seen in the following table:

Former way of preparation: D-glucose→
→tetraacetyl D-glucopyridiniumbromide
→nicotinamide of the tetraacetyl of the D-glucose
→dihydronicotinamide of the tetraacetyl of the D-glucose
→dihydronicotinamide of the D-glucose New way of preparation: D-glucose→
→D-glucosyl p-toluenesulfonate
→p-toluenesulfonate of nicotinamide of D-glucose
→dihydronicotinamide of D-glucose By this method certain coenzymes may be obtained in an uncomplicated process.

*Example A*

33.4 g. of glucosyl p-toluenesulfonate (0.1 mole) were dissolved in 40 cc. of dried pyridine by shaking at 20° C. for about one hour. The solution was allowed to stand for 3 days at 20° C. Then an amorphous substance was precipitated by adding 120 cc. of isopropyl alcohol. After standing for a short time in an ice box the precipitate was filtered off, washed with isopropyl alcohol and dried in a desiccator under a reduced pressure. 11.5 g. of glucosyl pyridinium p-toluenesulfonate were obtained in the form of an amorphous, hygroscopic substance. The p-toluenesulfonate group can be replaced by other acylate groups by way of ion exchangers. On analysis of the substance 7.25% of sulfur were found (calculated=7.76%).

*Example B*

7.6 g. of glucosyl p-toluenesulfonate (0.02 mole) were warmed and dissolved in a mixture of 100 cc. of ethanol and 30 cc. of water. After adding 2.5 g. of nicotinamide the mixture was allowed to stand at 20° C. for 2 days. Then the ethanol and the water were distilled off under reduced pressure. The remaining glass-like residue was shaken with 30 cc. of ethanol until it separated into fine flocks and then filtered off, washed with ethanol and dried. Only a little of the p-toluenesulfonate of the glucosyl nicotinamide was obtained. On analysis 6.78% of sulfur were found (calculated=7.02%).

*Example C*

3 g. of glucosyl p-toluenesulfonate (about 0.01 mole) were warmed and dissolved in 15 cc. of quinoline. The mixture was allowed to stand at 20° C. for 2 days. Then the excess of quinoline was distilled off under a reduced pressure. The remaining syrup was shaken with absolute ethanol until it separated in the form of flocks, which were then filtered off and dried in a desiccator under a reduced pressure. Only a little of the glucosyl quinolinium p-toluenesulfonate was obtained. On analysis 6.65% of sulfur were found (calculated=6.91%).

I claim:
1. A sugar ester of a formula selected from the group consisting of

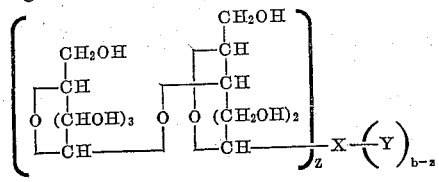

and

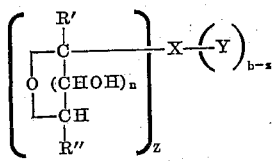

wherein each of R' and R'' is selected from the group consisting of hydrogen, the —CH$_2$OH group and the —CHOHCH$_2$OH group, X is a $b$ valent acid radical of a $b$ basic acid selected from the group consisting of sulfuric acid, phosphoric acid, phosphorous acid, pyrophosphoric acid, tetraphosphoric acid, boric acid and sulfonic acids, Y is a radical selected from the group consisting of lower alkyl and lower aralkyl radicals, $z$ is an integer of 1 to $b$, $b$ is an integer of 1 to 4 and $n$ is an integer from 2 to 3.

2. A sugar ester of the formula

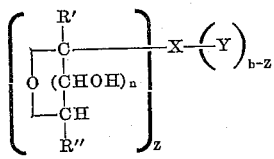

wherein each of R' and R'' is selected from the group consisting of hydrogen, the —CH$_2$OH group and the —CHOHCH$_2$OH group, X is a $b$ valent acid radical of a $b$ basic acid selected from the group consisting of sulfuric acid, phosphoric acid, phosphorous acid, pyrophosphoric acid, tetraphosphoric acid, boric acid and sulfonic acids, Y is a radical selected from the group consisting of lower alkyl and lower aralkyl radicals, $z$ is an integer of 1 to $b$, $b$ is an integer of 1 to 4 and $n$ is an integer from 2 to 3.

3. A sugar ester according to claim 2 in which X is a methylsulfate group.

4. A sugar ester according to claim 2 in which X is a p-toluenesulfonate group.

5. A sugar ester according to claim 2 in which X is a dialkyl phosphate group.

6. A sugar ester according to claim 2 in which X is a dialkyl phosphite group.

7. A sugar ester according to claim 2 in which X is a dialkyl borate.

8. The compound lactosyl p-toluenesulfonate in which the p-toluenesulfonate group replaces the semi-acetal hydroxy group of the lactose from which the compound is derived.

9. A process for the preparation of a sugar ester of a formula selected from the group consisting of

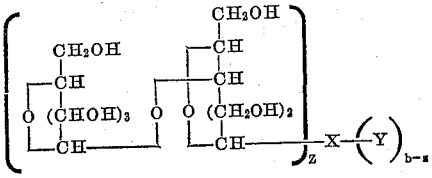

and

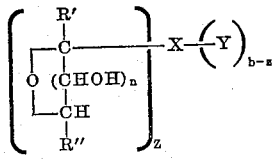

wherein each of R' and R'' is selected from the group consisting of hydrogen, the —CH$_2$OH group and the —CHOHCH$_2$OH group, X is a $b$ valent acid radical of a $b$ basic acid selected from the group consisting of sulfuric acid, phosphoric acid, phosphorous acid, pyrophosphoric acid, tetraphosphoric acid, boric acid and sulfonic acids, Y is a radical selected from the group consisting of lower alkyl and lower aralkyl radicals, $z$ is an integer of 1 to $b$, $b$ is an integer of 1 to 4 and $n$ is an integer from 2 to 3 which comprises reacting substantially in the absence of water a saccharide selected from the group consisting of lactose and monosaccharides containing a free semi-acetal hydroxy group and monosaccharides containing a free semi-ketal group with an ester of the formula $Y_bX$, wherein Y, $b$ and X have the same significance as above at a temperature between 20 and 90° C. for 30 to 2 hours.

10. The process of claim 9 in which Y is a lower alkyl group.

11. The process of claim 9 in which said reaction is carried out under subatmospheric pressure.

12. The process of claim 9 in which said reaction is carried out in an inert organic solvent.

References Cited in the file of this patent

UNITED STATES PATENTS

| | | |
|---|---|---|
| 1,598,370 | Goissedet et al. | Aug. 31, 1926 |
| 2,024,036 | Funaoka | Dec. 10, 1935 |
| 2,029,168 | Harris | Jan. 28, 1936 |
| 2,052,029 | Harris | Aug. 25, 1936 |
| 2,116,867 | Kreimeier et al. | May 10, 1938 |
| 2,715,121 | Glen et al. | Aug. 9, 1955 |
| 2,719,179 | Mora et al. | Sept. 27, 1955 |